Figure 1:
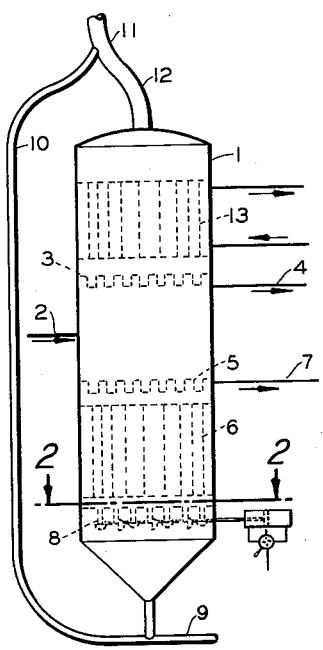

Sept. 20, 1955     H. J. PANKRATZ     2,718,339
FLOW CONTROLLER

Filed Dec. 29, 1949     3 Sheets-Sheet 1

INVENTOR.
H. J. PANKRATZ
BY Hudson & Young
ATTORNEYS

Sept. 20, 1955  H. J. PANKRATZ  2,718,339
FLOW CONTROLLER
Filed Dec. 29, 1949  3 Sheets-Sheet 2

INVENTOR.
H. J. PANKRATZ
BY Hudson & Young
ATTORNEYS

INVENTOR.
H. J. PANKRATZ
BY Hudson & Young
ATTORNEYS

United States Patent Office 2,718,339
Patented Sept. 20, 1955

2,718,339
FLOW CONTROLLER

Howard J. Pankratz, Bartlesville, Okla., assignor to Phillips Petroleum Company, a corporation of Delaware Application December 29, 1949, Serial No. 135,564

9 Claims. (Cl. 222—479)

This invention relates to an apparatus for controlling a continuous flow of mass of sub-divided solid material. In one of its aspects it relates to an apparatus for controlling in a regulable manner the flow of a catalytic or adsorbent solid sub-divided material employed in a moving bed type catalytic reactor or adsorber.

In the prior art many processes are known which employ a solid subdivided material moving downwardly as a bed through a vertical vessel. Such material is ordinarily a catalyst employed in a chemical reaction such as the catalytic cracking of hydrocarbon oils, or an adsorbent employed in a process for the separation of a mixture of two or more fluids into its component parts. In such processes, it is important that the total rate of flow of the sub-divided solid material be constant at any given rate and that the distribution of flow throughout the cross-sectional area of the process vessel be uniform. Heretofore efforts have been made to secure this desired uniformity of flow by employing such devices as an oscillating feeder tray, slide gates, etc. Although these devices have been quite successful in obtaining the desired uniformity of flow, their opening and closing have resulted in an inordinate amount of crushing and shearing of the particles of the material flowing through them due to the close tolerances between the various moving parts of the apparatus. As a result the consumption of granular material has been excessive and the fines produced by the crushing have often clogged other sections of the apparatus handling the sub-divided solid material. An apparatus which will not crush or shear granular solid material flowing through it and, at the same time, which will secure the desired uniformity of flow has been sought by the prior art as a desirable means for controlling the flow of such material.

According to this invention, there is provided an apparatus for controlling in a regulable manner a continuous flow of a solid sub-divided material whereby there is secured a uniform and continuous flow of the said material through a process vessel without concomitantly crushing or shearing the particles of material to form fines thereof. Still according to this invention, there is provided an apparatus comprising means so adapted to cause a bridge to be formed by particles of the said material which will stop their flow. This bridge is provided by placing a material collecting device across at least a part of the path of solid material discharging from a substantially vertical conduit whereby the particles will accumulate in the collecting device until they effectively plug or partially plug the said conduit. In this manner, the particles of material are not caught and crushed between any closely fitting metallic parts such as those in a valve but, instead, their accumulation on the collecting device will in itself cause their flow to partially or completely cease without any shearing or crushing action whatsoever. As a result the shearing effect on material particles due to their being crushed between moving parts of a flow regulating device is eliminated.

Figure 2:
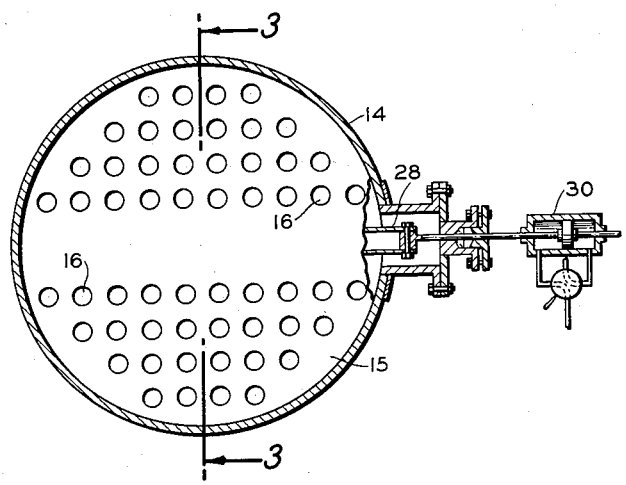
Figure 3:
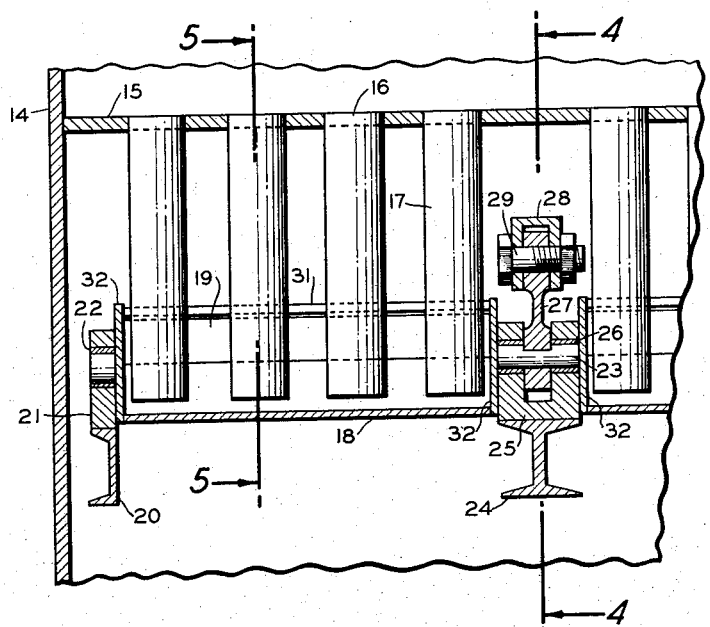
Figure 4:
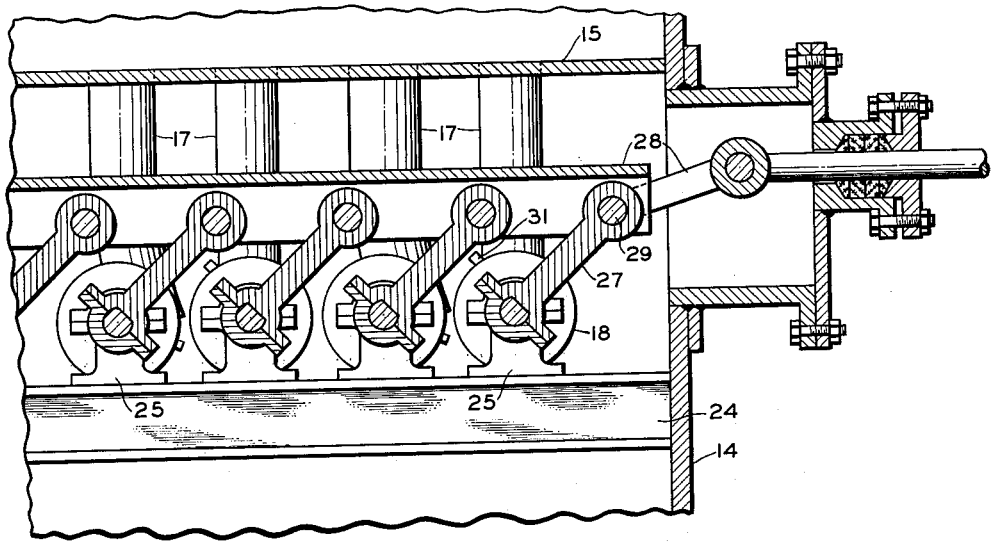
Figure 5:
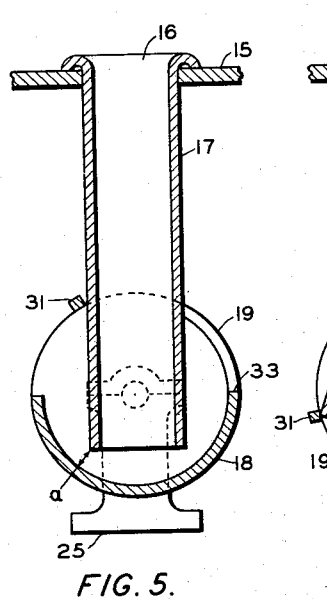
Figure 6:
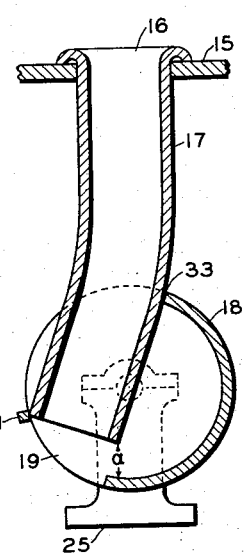
Figure 7:
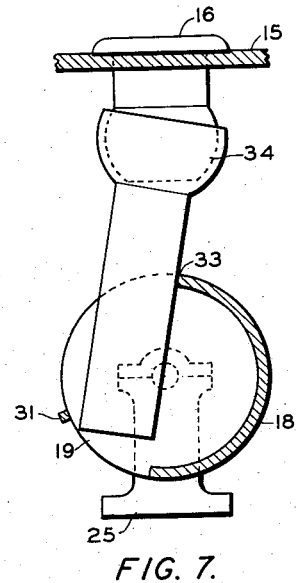
Figure 8:
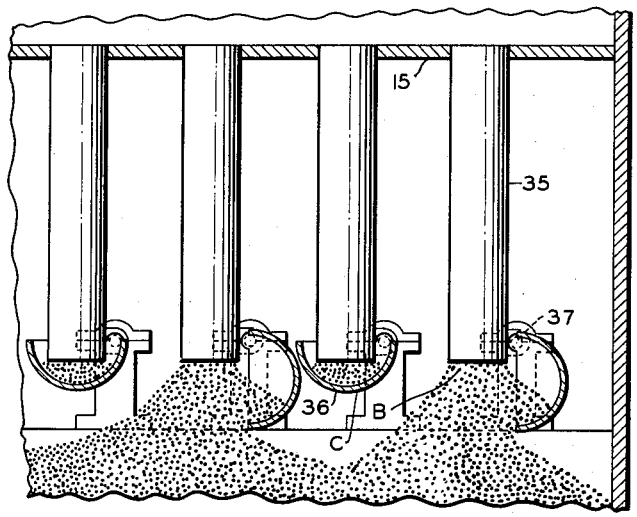
Figure 9:
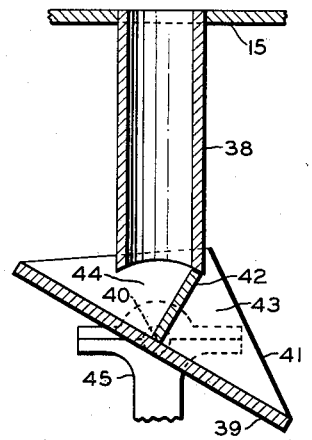
Figure 10:
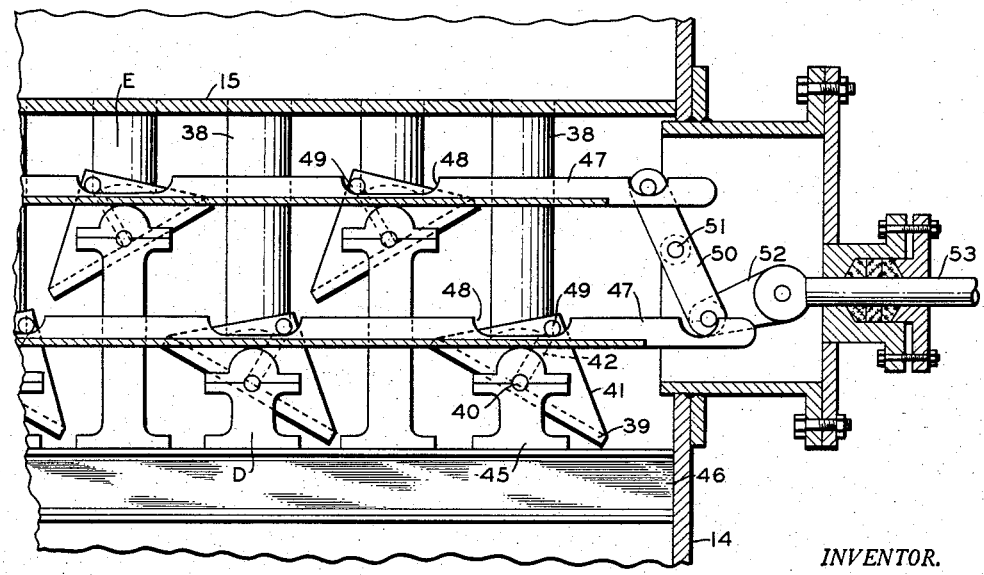

In order to more fully set forth the invention, it will now be described with particular reference to the attached drawings which demonstrate embodiments of the invention. In the drawing, Figure 1 is a schematic view of a hypersorption process and part of the appurtenant equipment in which the apparatus of this invention is particularly adapted to be employed. Figure 2 is a cross-sectional view taken on line 2—2 in Figure 1 showing a portion of the apparatus of this invention located in a vertical, cylindrical vessel. Figure 3 is a sectional view along 3—3 in Figure 2. Figure 4 is a view taken along 4—4 in Figure 3 showing the flow control apparatus in a closed position. Figure 5 is a cross-sectional view taken along 5—5 in Figure 3. Figure 6 is a view corresponding to that of Figure 5 except that the flow control apparatus is shown in an open position. Figure 7 illustrates a modification of the embodiment shown in Figures 5 and 6. Figures 8, 9 and 10 illustrate other embodiments of the apparatus than those shown in Figures 3, 4, 5 and 7.

Referring to Figure 1, there is shown a portion of the equipment employed in a hypersorption process for separating a mixture of fluids into its components by selective adsorption onto an adsorbent such as apricot pit or coconut charcoal. In the figure, the feed mixture to be separated enters vessel 1 through line 2 and flows upwardly and countercurrently to a bed of adsorbent flowing continuously downward in the vessel 1. The least readily adsorbed component of the feed is not adsorbed by the adsorbent material and disengages from the moving bed of adsorbent at disengaging tray 3 and leaves vessel 1 through line 4. The adsorbent material containing the most readily adsorbed component of the feed flows downwardly as a bed through disengaging tray 5 and through heating section 6 wherein it is heated sufficiently to strip the adsorbed component therefrom. This stripped component leaves vessel 1 through line 7. The hot, stripped adsorbent then passes through a flow regulating and controlling apparatus generally designated as 8 in Figure 1. This apparatus, which this invention particularly concerns, provides a means for controlling the rate of flow of adsorbent downwardly through the vessel as well as a means for uniformly controlling the flow across a given cross-sectional area of the vessel 1 above the apparatus 8. In this particular process, it is particularly important that the flow of adsorbent through the vessel is uniform in such a manner that the rate of flow at the center of the center of the vessel is the same as that at the edges of the vessel in order that the feed to be separated will be uniformly contacted with all of the flowing adsorbent. After passing through apparatus 8, the adsorbent is picked up by a gaseous carrier in line 9 and elevated to the top of the vessel 1 through line 10 where the adsorbent is disengaged from the carrier in separating device 11. This device is particularly designed to permit adsorbent material-gas separation without any substantial crushing or disintegration of the adsorbent into fines. The separated adsorbent then flows through line 12 to vessel 1 wherein it is cooled in cooler 13 and passed through disengaging tray 3 to complete the cycle. As stated, the apparatus of this invention is particularly concerned with the adsorbent flow controlling and regulating apparatus 8 shown in Figure 1. However it is to be understood that the apparatus of this invention can be advantageously employed in other processes wherein it is necessary to regulate the flow of a sub-divided solid mass such as in moving or fluid bed catalytic hydrocarbon treating processes, chemical reactions employing a moving catalyst, limestone converting processes, cement calcining processes, etc.

Referring to Figures 2, 3, 4, 5 and 6, a vertical reaction or adsorption vessel formed by wall 14 has a tray 15 disposed across its cross-section. Tray 15 has a plurality of apertures 16 in which are situated conduits 17. Conduits 17 are substantially flush at their upper end It is understood that the above described embodiment can be modified. Thus, receptacle or collector 36 can be any trough-shaped, V-shaped or semicircular section which will serve to accumulate therein sub-divided solid material flowing from conduit 35. Further, collector 36 can be adapted to serve only a single conduit 35 instead of a row of conduits as described. In such case, collector 36 will be in the shape of any ordinary receptacle such as a cup or a hollow hemisphere. It is to be understood that collectors 36 can be operatively actuated so as to all be open or all closed at any one time. It is also to be understood, in accordance with a preferred feature of this invention, that the receptacles 36 can be operatively connected with an actuating device such as that shown in Figures 2 and 3 whereby at least one of the receptacles will be in a closed position while at least one other is in an open position as described with reference to the embodiment shown in Figures 3, 4, 5 and 6. Thus the embodiment shown in Figure 8 will likewise secure a uniform continuous flow of sub-divided solid material without crushing the same.

Figures 9 and 10 illustrate an additional embodiment of the apparatus of this invention wherein conduits 38 depend from a tray 15. Located at the lower ends of a row of conduits 38 are collectors comprising inverted T-sections 39 pivotally mounted at their ends at axis 40 and having their ends closed by a section 41. Leg 42 of T-section 39 extends upwardly to the mouth of conduit 38, so as to form part of receptacles 43 and 44 as well as a diverting barrier when in the position shown in Figure 9. In this position, a receptacle 44 is formed beneath conduit 38 wherein the flowing particles of material will accumulate and eventually bridge across the lower end of conduit 38 thereby stopping flow therethrough. The lower end of conduit 38 is cut in an arc about point 40 so that leg 42 can form an effective seal along opposite sides of conduit 38. T-section 39 can be supported by bearing standards 45 situated on support 46 attached to walls 14. In operation, the inverted T-sections 39 oscillate back and forth to the positions D and E as shown in Figure 10 whereby the flow of material through conduit 38 flows alternately into adjacent receptacles 43 and 44. The flow of granular material through conduit 38 is regulated by regulating the speed of oscillation of the T-sections. Suitable operating linkages and an actuator as in Figures 2 and 3 can be provided to oscillate collectors 39 to positions D and E in order to secure a regulated and positive oscillation of the collectors. In Figure 10, such an operating linkage is shown as comprised of members 47 having slots 48 adapted to receive a bearing pin 49 which is attached to end 41 of T-section 39. The ends of members 47 can be connected by link 50 as shown. Link 50 has a fixed pivot point 51 and is connected by link 52 to a linkage 53 which is operatively connected to an actuating means (not shown). In operation, linkage 53 is reciprocated back and forth thereby causing members 47 to likewise reciprocate but in opposite directions to each other. This reciprocation causes T-sections 39 to oscillate back and forth about point 40. Slots 48 permit the weight of the material contained in receptacles 43 and 44 to semi-automatically assist in oscillating T-sections 39.

It is to be understood that although the collectors of Figures 9 and 10 have been described as inverted T-sections, they can be comprised of any section having adjacent receptacles mounted so as to oscillate first one and then the other receptacle across the discharge end of conduit 38. Thus the legs perpendicular to leg 42 of the T-section shown can be curved to form more pronounced adjacent receptacles than those shown in the drawing. Further, collector 39 can be readily adapted to serve a row of conduits or a single conduit. It is to be further understood that collectors 39 can be so attached to their oscillating linkages that at least one collector is at position E while at least one other is at position D.

It is further contemplated that the collectors of Figures 9 and 10 can be adapted to operate automatically without any positive actuating mechanism by balancing the collectors so that the weight of material flowing into a first receptacle of the collector will cause that collector to oscillate so that a second receptacle will be under the conduit 38 thereby filling it while the first receptacle is emptying. This action will be constantly repeated so as to secure a continuous flow of material through the process vessel. The rate of oscillation of the collector in such case can be controlled by adjusting the volume of the adjacent receptacles or by providing loading springs attached to each receptacle and to a stationary point in order to bias the oscillation of the collector.

It is apparent from the foregoing description of the invention that there is provided a means for controlling in a regulable manner a flow of solid sub-divided material without any crushing or shearing of the particles of material. It is to be especially noted that the provision of the collectors of this invention in conjunction with conduits through which is flowing a solid sub-divided material affords a surge chamber for the material in the form of the collectors associated with the said conduits. Thus, when a collector is oscillated into a closed position about the end of a conduit, the flow of material through the conduit is not immediately stopped but continues to flow until sufficient material accumulates in the collector to bridge across the end of the associated conduit. The flow of material is not thereby suddenly halted so as to cause additional crushing and shearing of the particles of material.

The flow controllers of this invention can be advantageously employed in combination with a solid material surge vessel. Referring to Figure 1, it is often desirable to provide a surge chamber in the bottom of vessel 1 in order to provide a flexible system of solid material flow control. In such case, flow controller 8 can be provided as shown and an additional flow controller (not shown) can be situated in vessel 1 a suitable distance below controller 8 in order to provide a chamber therebetween which will act as a surge chamber. Thus, flow controller 8 can be operated to secure the desired rate of solid material flow through heating section 6 and superposed sections while the flow controller below controller 8 can be operated to secure the desired rate of feed of solid material to line 10 in order to avoid overloading line 10.

While the invention has been described in connection with a present, preferred embodiment thereof, it is to be understood that this description is illustrative only and is not intended to limit the invention, the scope of which is defined by the appended claims.

I claim:

1. In an apparatus for controlling in a regulable manner a continuous flow of a mass of solid sub-divided material, in combination; a conduit placed in the line of flow of said material; a material collector coacting with the discharge end of said conduit, said collector comprising a rotatably mounted tube having a cutaway portion to form a trough-shaped section which is adapted to receive the discharge end of said conduit, the discharge end of said conduit being movable laterally from the axis of said conduit; a bar across said cutaway portion and adjacent the end of said conduit received in said tube and adapted to press against said conduit when said tube is moving to closed position, the edge of the cutaway portion of said tube to the side of the conduit opposite said bar being so formed as to press against said conduit when said tube is moving to open position, said conduit having its discharge end spaced from the inner surface of said trough-shaped section whereby rotation of the said tube does not result in crushing and shearing of said material between the end of said conduit and the trough-shaped section; an actuator adapted to rotate said collector to an open position whereby material will flow freely through the discharge end of said conduit does not result in crushing and shearing of said material between the end of said conduit and the trough shaped section; and actuating means connected to said two collectors to rotate said collectors to open positions whereby material can flow freely through the discharge end of said conduits past said tubes and to closed positions whereby material collects in said tubes to form bridges across the discharge ends of said conduits, said collectors being connected to one another and to said actuating means such that one of said collectors is in an open position when the second collector is in a closed position.

References Cited in the file of this patent

UNITED STATES PATENTS

| | | |
|---|---|---|
| 675,376 | Davis | June 4, 1901 |
| 1,264,732 | Williams | Apr. 30, 1918 |
| 1,588,838 | Jones | June 15, 1926 |
| 1,631,430 | Schreiber | June 7, 1927 |
| 2,486,200 | O'Connor | Oct. 25, 1949 |
| 2,590,202 | Norton | Mar. 25, 1952 |
| 2,661,868 | Siren | Dec. 8, 1953 |